United States Patent
Elefritz et al.

(10) Patent No.: US 7,455,765 B2
(45) Date of Patent: Nov. 25, 2008

(54) WASTEWATER TREATMENT SYSTEM AND METHOD

(75) Inventors: Robert A. Elefritz, Ormond Beach, FL (US); Wenjun Liu, King of Prussia, PA (US)

(73) Assignee: Siemens Water Technologies Corp., Lowell, MA (US)

( * ) Notice: Subject to any disclaimer, the term of this patent is extended or adjusted under 35 U.S.C. 154(b) by 268 days.

(21) Appl. No.: 11/339,186

(22) Filed: Jan. 25, 2006

(65) Prior Publication Data

US 2007/0170112 A1 Jul. 26, 2007

(51) Int. Cl.
*C02F 3/30* (2006.01)
*B01D 21/30* (2006.01)

(52) U.S. Cl. .............. 210/143; 210/195.2; 210/195.3; 210/259

(58) Field of Classification Search ............ 210/143, 210/195.1–195.3, 196, 252, 259, 903, 908
See application file for complete search history.

(56) References Cited

U.S. PATENT DOCUMENTS

| 256,008 A | 4/1882 | Leak |
| 285,321 A | 9/1883 | Tams |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,183,191 A | 5/1965 | Hach |
| 3,198,636 A | 8/1965 | Bouthilet |
| 3,228,876 A | 1/1966 | Mahon |
| 3,442,002 A | 5/1969 | Geary et al. |
| 3,462,362 A | 8/1969 | Kollsman |
| 3,492,698 A | 2/1970 | Geary et al. |
| 3,556,305 A | 1/1971 | Shorr |
| 3,591,010 A | 7/1971 | Pall |
| 3,625,827 A | 12/1971 | Wildi et al. |
| 3,654,147 A | 4/1972 | Levin et al. |
| 3,693,406 A | 9/1972 | Tobin, III |
| 3,700,561 A | 10/1972 | Ziffer |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,804,258 A | 4/1974 | Okuniewski et al. |

(Continued)

FOREIGN PATENT DOCUMENTS

AU 34400/84 9/1983

(Continued)

OTHER PUBLICATIONS

Almulla et al., Desalination, 153 (2002), pp. 237-243.

(Continued)

*Primary Examiner*—Fred Prince (57) ABSTRACT

The invention is directed to a wastewater treatment system having an anoxic biological treatment zone, an aerobic biological treatment zone and a separator. The concentration of oxygen in streams within the system is strategically managed for improved removal of nutrient from the wastewater. A source of biodegradable carbon may be introduced to reduce the concentration of oxygen within the system. An effective treatment time under anoxic or aerobic conditions may further be varied.

9 Claims, 3 Drawing Sheets

U.S. PATENT DOCUMENTS

| | | |
|---|---|---|
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,731 A | 8/1978 | Yamazaki |
| 4,107,043 A | 8/1978 | McKinney |
| 4,138,460 A | 2/1979 | Tigner |
| 4,183,890 A | 1/1980 | Bollinger |
| 4,188,817 A | 2/1980 | Steigelmann |
| 4,190,411 A | 2/1980 | Fujimoto |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,407,975 A | 10/1983 | Yamaguchi |
| 4,414,113 A | 11/1983 | LaTerra |
| 4,414,172 A | 11/1983 | Leason |
| 4,431,545 A | 2/1984 | Pall et al. |
| 4,451,369 A | 5/1984 | Sekino et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schleuter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,963,304 A | 10/1990 | Im et al. |
| 4,968,430 A | 11/1990 | Hildenbrand et al. |
| 4,968,733 A | 11/1990 | Muller et al. |
| 4,969,997 A | 11/1990 | Klüver et al. |
| 4,988,444 A | 1/1991 | Applegate et al. |
| 4,999,038 A | 3/1991 | Lundberg |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Müller et al. |
| 5,066,402 A | 11/1991 | Anselme et al. |
| 5,069,065 A | 12/1991 | Sprunt et al. |
| 5,075,065 A | 12/1991 | Effenberger et al. |
| 5,076,925 A | 12/1991 | Roesink et al. |
| 5,079,272 A | 1/1992 | Allegrezza et al. |
| 5,094,750 A | 3/1992 | Kopp et al. |
| 5,094,867 A | 3/1992 | Detering et al. |
| 5,098,567 A | 3/1992 | Nishiguchi |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,169,528 A | 12/1992 | Karbachsch et al. |
| 5,182,019 A | 1/1993 | Cote et al. |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |

| | | | | | |
|---|---|---|---|---|---|
| 5,198,116 A | 3/1993 | Comstock et al. | 5,944,997 A | 8/1999 | Pedersen et al. |
| 5,198,162 A | 3/1993 | Park et al. | 5,951,878 A | 9/1999 | Astrom |
| 5,209,852 A | 5/1993 | Sunaoka et al. | 5,958,243 A | 9/1999 | Lawrence et al. |
| 5,211,823 A | 5/1993 | Giuffrida et al. | 5,968,357 A | 10/1999 | Doelle et al. |
| 5,221,478 A | 6/1993 | Dhingra et al. | 5,988,400 A | 11/1999 | Karachevtcev et al. |
| 5,227,063 A | 7/1993 | Langerak et al. | 5,989,428 A * | 11/1999 | Goronszy ............... 210/605 |
| 5,248,424 A | 9/1993 | Cote et al. | 5,997,745 A | 12/1999 | Tonelli et al. |
| 5,262,054 A | 11/1993 | Wheeler | 6,017,451 A | 1/2000 | Kopf |
| 5,271,830 A | 12/1993 | Faivre et al. | 6,024,872 A | 2/2000 | Mahendran et al. |
| 5,275,766 A | 1/1994 | Gadkaree et al. | 6,036,030 A | 3/2000 | Stone et al. |
| 5,286,324 A | 2/1994 | Kawai et al. | 6,039,872 A | 3/2000 | Wu et al. |
| 5,290,451 A * | 3/1994 | Koster et al. ............... 210/605 | 6,042,677 A | 3/2000 | Mahendran et al. |
| 5,290,457 A | 3/1994 | Karbachasch et al. | 6,045,698 A | 4/2000 | Côté et al. |
| 5,297,420 A | 3/1994 | Gilliland et al. | 6,045,899 A | 4/2000 | Wang et al. |
| 5,316,671 A | 5/1994 | Murphy | 6,048,454 A | 4/2000 | Jenkins |
| 5,320,760 A | 6/1994 | Freund et al. | 6,048,455 A | 4/2000 | Janik |
| 5,353,630 A | 10/1994 | Soda et al. | 6,066,401 A | 5/2000 | Stilburn |
| 5,358,732 A | 10/1994 | Seifter et al. | 6,074,718 A | 6/2000 | Puglia et al. |
| 5,361,625 A | 11/1994 | Ylvisaker | 6,077,435 A | 6/2000 | Beck et al. |
| 5,364,527 A | 11/1994 | Zimmermann et al. | 6,083,393 A | 7/2000 | Wu et al. |
| 5,364,529 A | 11/1994 | Morin et al. | 6,096,213 A | 8/2000 | Radovanovic et al. |
| 5,374,353 A | 12/1994 | Murphy | 6,113,782 A | 9/2000 | Leonard |
| 5,389,260 A | 2/1995 | Hemp et al. | 6,120,688 A | 9/2000 | Daly et al. |
| 5,393,433 A | 2/1995 | Espenan et al. | 6,126,819 A | 10/2000 | Heine et al. |
| 5,396,019 A | 3/1995 | Sartori et al. | 6,146,747 A | 11/2000 | Wang et al. |
| 5,401,401 A | 3/1995 | Hickok et al. | 6,149,817 A | 11/2000 | Peterson et al. |
| 5,401,405 A | 3/1995 | McDougald | 6,156,200 A | 12/2000 | Zha et al. |
| 5,403,479 A | 4/1995 | Smith et al. | 6,159,373 A | 12/2000 | Beck et al. |
| 5,405,528 A | 4/1995 | Selbie et al. | 6,193,890 B1 | 2/2001 | Pedersen et al. |
| 5,411,663 A | 5/1995 | Johnson | 6,202,475 B1 | 3/2001 | Selbie et al. |
| 5,417,101 A | 5/1995 | Weich | 6,214,231 B1 | 4/2001 | Cote et al. |
| 5,419,816 A | 5/1995 | Sampson et al. | 6,214,232 B1 | 4/2001 | Baurmeister et al. |
| 5,451,317 A | 9/1995 | Ishida et al. | 6,221,247 B1 | 4/2001 | Nemser et al. |
| 5,468,397 A | 11/1995 | Barboza et al. | 6,245,239 B1 | 6/2001 | Cote et al. |
| 5,470,469 A | 11/1995 | Eckman | 6,254,773 B1 | 7/2001 | Biltoft |
| 5,477,731 A | 12/1995 | Mouton | 6,264,839 B1 | 7/2001 | Mohr et al. |
| 5,479,590 A | 12/1995 | Lin | 6,277,512 B1 | 8/2001 | Hamrock et al. |
| 5,480,553 A | 1/1996 | Yamamori et al. | 6,280,626 B1 | 8/2001 | Miyashita et al. |
| 5,484,528 A | 1/1996 | Yagi et al. | 6,284,135 B1 | 9/2001 | Ookata |
| 5,490,939 A | 2/1996 | Gerigk et al. | 6,290,756 B1 | 9/2001 | Macheras et al. |
| 5,491,023 A | 2/1996 | Tsai et al. | 6,294,039 B1 | 9/2001 | Mahendran et al. |
| 5,501,798 A | 3/1996 | Al-Samadi et al. | 6,299,773 B1 | 10/2001 | Takamura et al. |
| 5,525,220 A | 6/1996 | Yagi et al. | 6,303,026 B1 | 10/2001 | Lindbo |
| 5,531,848 A | 7/1996 | Brinda et al. | 6,303,035 B1 | 10/2001 | Cote et al. |
| 5,531,900 A | 7/1996 | Raghaven et al. | 6,315,895 B1 | 11/2001 | Summerton et al. |
| 5,543,002 A | 8/1996 | Brinda et al. | 6,322,703 B1 | 11/2001 | Taniguchi et al. |
| 5,552,047 A | 9/1996 | Oshida et al. | 6,325,928 B1 | 12/2001 | Pedersen et al. |
| 5,554,283 A | 9/1996 | Brinda et al. | 6,337,018 B1 | 1/2002 | Mickols |
| 5,556,591 A | 9/1996 | Jallerat et al. | RE37,549 E | 2/2002 | Mahendran et al. |
| 5,575,963 A | 11/1996 | Soffer et al. | 6,354,444 B1 | 3/2002 | Mahendran |
| 5,597,732 A | 1/1997 | Bryan-Brown | 6,361,695 B1 | 3/2002 | Husain et al. |
| 5,607,593 A | 3/1997 | Cote et al. | 6,368,819 B1 | 4/2002 | Gaddy et al. |
| 5,639,373 A | 6/1997 | Mahendran et al. | 6,375,848 B1 | 4/2002 | Cote et al. |
| 5,643,455 A | 7/1997 | Kopp et al. | 6,387,189 B1 | 5/2002 | Gröschl et al. |
| 5,647,988 A | 7/1997 | Kawanishi et al. | 6,402,955 B2 | 6/2002 | Ookata |
| 5,670,053 A | 9/1997 | Collentro et al. | 6,406,629 B1 | 6/2002 | Husain et al. |
| 5,677,360 A | 10/1997 | Yamamori et al. | 6,423,214 B1 | 7/2002 | Lindbo |
| 5,688,460 A | 11/1997 | Ruschke | 6,423,784 B1 | 7/2002 | Hamrock et al. |
| 5,733,456 A | 3/1998 | Okey et al. | 6,432,310 B1 | 8/2002 | Andou et al. |
| 5,744,037 A | 4/1998 | Fujimura et al. | 6,440,303 B2 | 8/2002 | Spriegel |
| 5,747,605 A | 5/1998 | Breant et al. | D462,699 S | 9/2002 | Johnson et al. |
| 5,766,479 A | 6/1998 | Collentro et al. | 6,444,124 B1 | 9/2002 | Onyeche et al. |
| 5,783,083 A | 7/1998 | Henshaw et al. | 6,468,430 B1 | 10/2002 | Kimura et al. |
| 5,843,069 A | 12/1998 | Butler et al. | 6,485,645 B1 | 11/2002 | Husain et al. |
| 5,846,424 A | 12/1998 | Khudenko | 6,495,041 B2 | 12/2002 | Taniguchi et al. |
| 5,888,401 A | 3/1999 | Nguyen | 6,524,481 B2 | 2/2003 | Zha et al. |
| 5,895,570 A | 4/1999 | Liang | 6,524,733 B1 | 2/2003 | Nonobe |
| 5,906,739 A | 5/1999 | Osterland et al. | 6,550,747 B2 | 4/2003 | Rabie et al. |
| 5,906,742 A | 5/1999 | Wang et al. | 6,555,005 B1 | 4/2003 | Zha et al. |
| 5,910,250 A | 6/1999 | Mahendran et al. | 6,562,237 B1 * | 5/2003 | Olaopa ............... 210/605 |
| 5,914,039 A | 6/1999 | Mahendran et al. | 6,576,136 B1 | 6/2003 | De Moel et al. |
| 5,918,264 A | 6/1999 | Drummond et al. | D478,913 S | 8/2003 | Johnson et al. |
| 5,942,113 A | 8/1999 | Morimura | 6,620,319 B2 | 9/2003 | Behmann et al. |

| | | | |
|---|---|---|---|
| 6,627,082 B2 | 9/2003 | Del Vecchio |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,189 B2 | 3/2004 | Rabie et al. |
| 6,708,957 B2 | 3/2004 | Cote et al. |
| 6,712,970 B1 * | 3/2004 | Trivedi ............... 210/605 |
| 6,721,529 B2 | 4/2004 | Chen et al. |
| 6,723,758 B2 | 4/2004 | Stone et al. |
| 6,727,305 B1 | 4/2004 | Pavez Aranguiz |
| 6,743,362 B1 * | 6/2004 | Porteous et al. .......... 210/605 |
| 6,758,972 B2 | 7/2004 | Vriens et al. |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,912 B2 | 9/2004 | Blong |
| 6,805,806 B2 | 10/2004 | Arnaud |
| 6,808,629 B2 * | 10/2004 | Wouters-Wasiak et al. .. 210/605 |
| 6,811,696 B2 | 11/2004 | Wang et al. |
| 6,814,861 B2 | 11/2004 | Husain et al. |
| 6,821,420 B2 | 11/2004 | Zha et al. |
| 6,841,070 B2 | 1/2005 | Zha et al. |
| 6,861,466 B2 | 3/2005 | Dadalas et al. |
| 6,863,817 B2 | 3/2005 | Liu et al. |
| 6,863,823 B2 | 3/2005 | Côté |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowel |
| 7,018,530 B2 | 3/2006 | Pollock |
| 7,018,533 B2 | 3/2006 | Johnson et al. |
| 7,022,233 B2 * | 4/2006 | Chen .................. 210/605 |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,701 B2 | 2/2007 | Gaid et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,300,022 B2 | 11/2007 | Muller |
| 7,314,563 B2 * | 1/2008 | Cho et al. ............... 210/605 |
| 2002/0070157 A1 | 6/2002 | Yamada |
| 2002/0148767 A1 | 10/2002 | Johnson et al. |
| 2003/0038080 A1 | 2/2003 | Vriens et al. |
| 2003/0057155 A1 | 3/2003 | Husain et al. |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 * | 8/2003 | Daigger et al. ............ 210/605 |
| 2003/0178365 A1 | 9/2003 | Zha et al. |
| 2003/0226797 A1 | 12/2003 | Phelps |
| 2004/0007525 A1 | 1/2004 | Rabie et al. |
| 2004/0035770 A1 | 2/2004 | Edwards et al. |
| 2004/0084369 A1 | 5/2004 | Zha et al. |
| 2004/0145076 A1 | 7/2004 | Zha et al. |
| 2004/0168979 A1 | 9/2004 | Zha et al. |
| 2004/0178154 A1 | 9/2004 | Zha et al. |
| 2004/0217053 A1 | 11/2004 | Zha et al. |
| 2004/0232076 A1 | 11/2004 | Zha et al. |
| 2005/0029185 A1 | 2/2005 | Muller |
| 2005/0029186 A1 | 2/2005 | Muller |
| 2005/0032982 A1 | 2/2005 | Muller et al. |
| 2005/0103722 A1 | 5/2005 | Freydina et al. |
| 2005/0115880 A1 | 6/2005 | Pollock |
| 2005/0115899 A1 | 6/2005 | Liu et al. |
| 2005/0139538 A1 | 6/2005 | Lazaredes |
| 2005/0194310 A1 | 9/2005 | Yamamoto et al. |
| 2005/0194315 A1 | 9/2005 | Adams et al. |
| 2006/0000775 A1 | 1/2006 | Zha et al. |
| 2006/0131234 A1 | 6/2006 | Zha et al. |
| 2006/0201876 A1 | 9/2006 | Jordan |
| 2006/0261007 A1 | 11/2006 | Zha et al. |
| 2006/0273038 A1 | 12/2006 | Syed et al. |
| 2007/0007214 A1 | 1/2007 | Zha et al. |
| 2007/0056905 A1 | 3/2007 | Beck et al. |
| 2007/0075021 A1 | 4/2007 | Johnson |
| 2007/0084791 A1 * | 4/2007 | Jordan et al. ............ 210/608 |
| 2007/0108125 A1 | 5/2007 | Cho et al. |
| 2007/0227973 A1 | 10/2007 | Zha et al. |

FOREIGN PATENT DOCUMENTS

| | | |
|---|---|---|
| AU | 55847/86 | 3/1985 |
| AU | 77066/87 | 7/1986 |
| CN | 1050770 C | 1/1995 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 29804927 U1 | 6/1998 |
| DE | 29906389 | 6/1999 |
| EP | 012557 B1 | 2/1983 |
| EP | 126714 A2 | 11/1984 |
| EP | 050447 B1 | 10/1985 |
| EP | 250337 A1 | 12/1987 |
| EP | 327025 A1 | 8/1989 |
| EP | 090383 B1 | 5/1990 |
| EP | 407900 A2 | 1/1991 |
| EP | 463627 A2 | 1/1992 |
| EP | 492446 B1 | 7/1992 |
| EP | 492942 A2 | 7/1992 |
| EP | 518250 B1 | 12/1992 |
| EP | 547575 A1 | 6/1993 |
| EP | 395133 B1 | 2/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 1034835 A1 | 9/2000 |
| EP | 1052012 A1 | 11/2000 |
| EP | 1349644 | 10/2003 |
| EP | 1350555 A1 | 10/2003 |
| EP | 1236503 B1 | 8/2004 |
| FR | 2620712 | 3/1989 |
| FR | 2674448 | 10/1992 |
| FR | 2699424 | 6/1994 |
| GB | 702911 | 1/1954 |
| GB | 2253572 A | 9/1992 |
| JP | 54-162684 | 12/1979 |

| | | | | | | |
|---|---|---|---|---|---|---|
| JP | 55-129155 | 6/1980 | | JP | 07-185268 | 7/1995 |
| JP | 55-099703 | 7/1980 | | JP | 07-185271 | 7/1995 |
| JP | 55-129107 | 10/1980 | | JP | 07-236819 | 9/1995 |
| JP | 56-021604 | 2/1981 | | JP | 07-251043 | 10/1995 |
| JP | 56-118701 | 9/1981 | | JP | 07-275665 | 10/1995 |
| JP | 56-121685 | 9/1981 | | JP | 07-289860 | 11/1995 |
| JP | 58-088007 | 5/1983 | | JP | 07-303895 | 11/1995 |
| JP | 60-019002 | 1/1985 | | JP | 08-010585 | 1/1996 |
| JP | 60-206412 | 10/1985 | | JP | 09-099227 | 4/1997 |
| JP | 61-097005 | 5/1986 | | JP | 09-141063 | 6/1997 |
| JP | 61-097006 | 5/1986 | | JP | 09-187628 | 7/1997 |
| JP | 61-107905 | 5/1986 | | JP | 09-220569 | 8/1997 |
| JP | 61-167406 | 7/1986 | | JP | 09-271641 | 10/1997 |
| JP | 61-167407 | 7/1986 | | JP | 09-324067 | 12/1997 |
| JP | 61-171504 | 8/1986 | | JP | 10-033955 | 2/1998 |
| JP | 61-192309 | 8/1986 | | JP | 10-048466 | 2/1998 |
| JP | 61-222510 | 10/1986 | | JP | 10-085565 | 4/1998 |
| JP | 61-242607 | 10/1986 | | JP | 10-156149 | 6/1998 |
| JP | 61-249505 | 11/1986 | | JP | 11-028467 | 2/1999 |
| JP | 61-257203 | 11/1986 | | JP | 11-156166 | 6/1999 |
| JP | 61-263605 | 11/1986 | | JP | 11-165200 | 6/1999 |
| JP | 61-291007 | 12/1986 | | JP | 11-333265 | 7/1999 |
| JP | 61-293504 | 12/1986 | | JP | 11-033365 | 9/1999 |
| JP | 62-004408 | 1/1987 | | JP | 11-319507 | 11/1999 |
| JP | 62-114609 | 5/1987 | | JP | 2000-070684 | 3/2000 |
| JP | 62-140607 | 6/1987 | | JP | 2000-157850 | 6/2000 |
| JP | 62-144708 | 6/1987 | | JP | 2000-185220 | 7/2000 |
| JP | 62-163708 | 7/1987 | | JP | 2000-317276 | 11/2000 |
| JP | 62-179540 | 8/1987 | | JP | 2001-009246 | 1/2001 |
| JP | 62-250908 | 10/1987 | | JP | 2001-070967 | 3/2001 |
| JP | 63-097634 | 4/1988 | | JP | 2001-079367 | 3/2001 |
| JP | 63-143905 | 6/1988 | | JP | 2001-104760 | 4/2001 |
| JP | 63-171607 | 7/1988 | | JP | 2001-190937 | 7/2001 |
| JP | 63-180254 | 7/1988 | | JP | 2001-190938 | 7/2001 |
| JP | S63-38884 | 10/1988 | | JP | 2001-205055 | 7/2001 |
| JP | 01-151906 | 6/1989 | | JP | 2000-342932 | 12/2002 |
| JP | 01-307409 | 12/1989 | | JP | 2003-047830 | 2/2003 |
| JP | 02-026625 | 1/1990 | | JP | 2003-062436 | 3/2003 |
| JP | 02-031200 | 2/1990 | | JP | 2003-135935 | 5/2003 |
| JP | 02-107318 | 4/1990 | | KR | 2002-0090967 | 12/2002 |
| JP | 02-126922 | 5/1990 | | NL | 1020491 C | 10/2003 |
| JP | 02-144132 | 6/1990 | | NL | 1021197 C | 10/2003 |
| JP | 02-164423 | 6/1990 | | TW | 347343 | 12/1998 |
| JP | 02-277528 | 11/1990 | | WO | WO 1988-06200 | 8/1988 |
| JP | 02-284035 | 11/1990 | | WO | WO 1989-00880 | 2/1989 |
| JP | 03-018373 | 1/1991 | | WO | WO 1990-00434 | 1/1990 |
| JP | 03-028797 | 2/1991 | | WO | WO 1991-04783 | 4/1991 |
| JP | 03-110445 | 5/1991 | | WO | WO 1991-16124 | 10/1991 |
| JP | 04-187224 | 7/1992 | | WO | WO 1993-02779 | 2/1993 |
| JP | 04-250898 | 9/1992 | | WO | WO 1993-15827 | 8/1993 |
| JP | 04-256424 | 9/1992 | | WO | WO 1993-23152 | 11/1993 |
| JP | 04-265128 | 9/1992 | | WO | WO 1994-11094 | 5/1994 |
| JP | 04-293527 | 10/1992 | | WO | WO 1995-34424 | 12/1995 |
| JP | 04-310223 | 11/1992 | | WO | WO 1996-07470 A1 | 3/1996 |
| JP | 04-348252 | 12/1992 | | WO | WO 1996-28236 | 9/1996 |
| JP | 05-023557 | 2/1993 | | WO | WO 1996-41676 | 12/1996 |
| JP | 05-096136 | 4/1993 | | WO | WO 1997-06880 | 2/1997 |
| JP | 05-137977 | 6/1993 | | WO | WO 1998-22204 | 5/1998 |
| JP | 05-157654 | 6/1993 | | WO | WO 1998-25694 | 6/1998 |
| JP | 05-285348 | 11/1993 | | WO | WO 1998-28066 | 7/1998 |
| JP | 06-071120 | 3/1994 | | WO | WO 1998-53902 | 12/1998 |
| JP | 06-114240 | 4/1994 | | WO | WO 1999-01207 | 1/1999 |
| JP | 06-218237 | 8/1994 | | WO | WO 1999-59707 | 11/1999 |
| JP | 06-277469 | 10/1994 | | WO | WO 2000-18498 | 4/2000 |
| JP | 06-285496 | 10/1994 | | WO | WO 2000-30742 | 6/2000 |
| JP | 06-343837 | 12/1994 | | WO | WO 2001-00307 | 1/2001 |
| JP | 07-000770 | 1/1995 | | WO | WO 2001-32299 | 5/2001 |
| JP | 07-024272 | 1/1995 | | WO | WO 2001-36075 | 5/2001 |
| JP | 07-068139 | 3/1995 | | WO | WO 2001-45829 A1 | 6/2001 |
| JP | 07-136470 | 5/1995 | | WO | WO 2002-40140 A1 | 5/2002 |
| JP | 07-136471 | 5/1995 | | WO | WO 2003-000389 A2 | 1/2003 |
| JP | 07-155758 | 6/1995 | | WO | WO 2003-013706 A1 | 2/2003 |
| JP | 07-178323 | 7/1995 | | WO | WO 2004-101120 A1 | 11/2004 |

| | | | |
|---|---|---|---|
| WO | WO 2005-021140 A1 | 3/2005 |
| WO | WO 2005-037414 A1 | 4/2005 |
| WO | WO 2005-077499 A1 | 8/2005 |
| WO | WO 2006-029456 A1 | 3/2006 |

OTHER PUBLICATIONS

Anonymous, "*Nonwoven Constructions of Dyneon™ THV and Dyneon™ THE Fluorothermoplastics*", Research Disclosure Journal, Apr. 1999, RD 420013, 2 pages.

Cote et al., *Wat. Sci. Tech.* 38(4-5) (1998), pp. 437-442.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Recent Advances in Microfiltration for Drinking Water Treatment; An Introduction to CMF-S, Presentation, date unknown.

Kaiya et al., "Water Purification Using Hollow Fiber Microfiltration Membranes," 6th World Filtration Congress, Nagoya, 1993, pp. 813-816.

Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

MicroC™-Carbon Source for Wastewater Denitrification. Information from Environmental Operating Solutions website including MSDS, date unknown.

Nakayama, "Introduction to Fluid Mechanics," Butterworth-Heinemann, Oxford, UK, 2000.

Ramaswammy S. et al., "Fabrication of Ply (ECTFE) Membranes via thermally induced phase Separation", *Journal of Membrane Science*, (Dec. 1, 2002), pp. 175-180, vol. 210 No. 1, Scientific Publishing ComAmsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

*Water Encyclopedia*, edited by Jay Lehr, published by John Wiley & Sons, Inc., Hoboken, New Jersey, 2005. Available at http://wwwmmrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

Zenon, "Proposal for ZeeWee® Membrane Filtration Equipment System for the City of Westminster, Colorado, Proposal No. 479-99," Mar. 2000, entire publication.

* cited by examiner

WASTEWATER TREATMENT SYSTEM AND METHOD

BACKGROUND OF THE INVENTION

1. Field of the Invention

The present invention relates to a system and method for treating wastewater, and more particularly to managing the concentration of oxygen compounds in streams of a wastewater treatment system.

2. Discussion of Related Art

Wastewater treatment requirements continue to heighten in response to health and environment concerns regarding the impact of released effluents. For example, effective conversion of phosphates and nitrogen-containing compounds, which may promote the growth of harmful water plants and algae, is often a primary objective of wastewater treatment systems. Chemical precipitation techniques may be used for removal of these pollutants but have associated high chemical costs. Biological treatment methods, employing microorganisms to convert pollutants, have emerged as an alternative approach.

For example, membrane bioreactors (MBRs) are gaining importance in wastewater treatment technology. MBRs may combine biological and physical processes in one stage thus providing a compact, cost-effective and efficient solution capable of accommodating a wide range of wastewater treatment applications. MBR systems typically involve biological processes upstream of a membrane separator.

In general, biological wastewater treatment systems often consist of anaerobic, anoxic and/or aerobic treatment zones in addition to a separator. The presence of oxygen within biological wastewater treatment systems may benefit some biological processes while interfering with others. Thus, strategic management of oxygen in streams within the wastewater treatment system may prove desirable.

BRIEF SUMMARY OF THE INVENTION

In accordance with one or more embodiments, the invention relates to a system and method of treating wastewater.

In accordance with one or more embodiments, the invention relates to a wastewater treatment system, comprising an anoxic treatment zone, an aerobic treatment zone fluidly connected to the anoxic treatment zone, a separator fluidly connected to the aerobic treatment zone, and a means for varying an effective treatment time under anoxic conditions.

In accordance with one or more embodiments, the invention relates to a wastewater treatment system, comprising a first biological treatment zone, a second biological treatment zone fluidly connected to the first biological treatment zone, a membrane module comprising a filter membrane fluidly connected to the second biological treatment zone, a recycle system fluidly connecting the membrane module to the first biological treatment zone, and a source of biodegradable carbon fluidly connected to the recycle system.

In accordance with one or more embodiments, the invention relates to a wastewater treatment system, comprising a first biological treatment zone, having an inlet and an outlet; a second biological treatment zone, having an inlet and an outlet, fluidly connected to the first biological treatment zone; a third biological treatment zone, having an inlet and an outlet, fluidly connected to the second biological treatment zone; and a separator, having an inlet and an outlet, fluidly connected to the third biological treatment zone. The outlet of the separator is fluidly connected to the inlet of the third biological treatment zone, and the outlet of the third biological treatment zone is fluidly connected to the inlet of the second biological treatment zone.

In accordance with one or more embodiments, the invention relates to a method of treating wastewater, comprising anoxically treating the wastewater to produce a first water product, aerobically treating the first water product to produce a second water product, passing the second water product through a filter membrane to produce a concentrated mixed liquor and a filtrate, and reducing a concentration of dissolved oxygen in at least a portion of the concentrated mixed liquor.

In accordance with one or more embodiments, the invention relates to a method of treating wastewater, comprising introducing the wastewater to an anoxic treatment zone, introducing the wastewater exiting the anoxic treatment zone to an aerobic treatment zone, passing at least a portion of the wastewater exiting the aerobic treatment zone through a separator to produce a concentrated mixed liquor and a filtrate, recycling at least a portion of the concentrated mixed liquor to the aerobic treatment zone, and recycling at least a portion of the wastewater from the aerobic treatment zone to the anoxic treatment zone.

In accordance with one or more embodiments, the invention relates to a method of treating wastewater, comprising contacting the wastewater with anoxic bacteria in an anoxic zone to produce a first water product, contacting the first water product with aerobic bacteria in an aerobic zone to produce a second water product, passing the second water product through a separator to produce a concentrated mixed liquor and a filtrate, establishing a first liquid circuit from an outlet of the separator to an inlet of the aerobic zone, and establishing a second liquid circuit from an outlet of the aerobic zone to an inlet of the anoxic zone.

In accordance with one or more embodiments, the invention relates to a method of treating wastewater, comprising introducing the wastewater to an anoxic biological treatment zone, introducing the wastewater exiting the anoxic biological treatment zone to an aerobic biological treatment zone, passing at least a portion of the wastewater exiting the aerobic biological treatment zone through a separator to produce a concentrated mixed liquor and a filtrate, and adjusting an effective volume of the anoxic biological treatment zone.

In accordance with one or more embodiments, the invention relates to a wastewater treatment system, comprising an anoxic treatment zone, an aerobic treatment zone fluidly connected to the anoxic treatment zone, a separator fluidly connected to the aerobic treatment zone, and a controller in communication with an aeration system and configured to generate a first aeration control signal to allow increase of an effective volume of the anoxic treatment zone during a first biological treatment mode of operation, and further configured to generate a second aeration control signal to allow reduction of the effective volume of the anoxic treatment zone to a design condition during a second biological treatment mode of operation.

In accordance with one or more embodiments, the invention relates to a method of facilitating treating wastewater, comprising providing a wastewater treatment system, comprising a first biological treatment zone, a second biological treatment zone fluidly connected to the first biological treatment zone, a membrane module comprising a filter membrane fluidly connected to the second biological treatment zone, a recycle system fluidly connecting the membrane module to the first biological treatment zone, and a source of biodegradable carbon fluidly connected to the recycle system.

Other advantages, novel features and objects of the invention will become apparent from the following detailed description of the invention when considered in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by like numeral. For purposes of clarity, not every component may be labeled in every drawing. Preferred, non-limiting embodiments of the present invention will be described with reference to the accompanying drawings, in which.

DETAILED DESCRIPTION OF THE INVENTION

This invention is not limited in its application to the details of construction and the arrangement of components as set forth in the following description or illustrated in the drawings. The invention is capable of embodiments and of being practiced or carried out in various ways beyond those exemplarily presented herein.

In accordance with one or more embodiments, the invention relates to one or more systems and methods for treating wastewater. In typical operation, the wastewater treatment system may receive wastewater from a community, industrial or residential source. For example, the wastewater may be delivered from a municipal or other large-scale sewage system. Alternatively, the wastewater may be generated, for example, by food processing or pulp and paper plants. The wastewater may be moved through the system by operation upstream or downstream of the system.

As used herein, the term "wastewater" refers to a stream of waste, bearing at least one undesirable constituent capable of being converted by bacteria, deliverable to the wastewater treatment system for treatment. More specifically, the undesirable constituent may be a biodegradable material, such as an inorganic or organic compound that participates or is involved in the metabolism of a microorganism. For example, the undesirable constituent may include nitrate, nitrite, phosphorous, ammonia, and the like, typically present in wastewater. The type and concentration of undesirable constituents present in the wastewater may be site-specific. Communities may establish regulations regarding these undesirable constituents. For the purposes of the present description, wastewater refers to what is fed to the system and what is treated throughout. Wastewater may be referred to herein, for example, as a first, second or third water product.

As used herein, the term "wastewater treatment system" is a system, typically a biological treatment system, having a population of microorganisms, including a diversity of types of bacteria, used to decompose biodegradable material. The conversion of pollutants to innocuous compounds is typically facilitated or mediated by the microorganisms as the wastewater is passed through the wastewater treatment system. A biomass of microorganisms typically requires an environment that provides the proper conditions for growth or biological activity.

According to one or more embodiments of the invention, the wastewater treatment system of the present invention may be a bioreactor having one or more treatment zones. As used herein, the term "treatment zone" is used to denote an individual treatment region, which can be characterized as promoting, effecting, or exhibiting a type of metabolic activity or biological process. Multiple treatment regions or zones may be housed in a single vessel. Alternatively, a treatment region or zone may be housed in a separate vessel, wherein a different treatment is carried out in each separate vessel. The treatment zones may be sized and shaped according to a desired application and to accommodate a volume of wastewater to be treated. For example, hydraulic residence times of various unit operations of the treatment system may depend on factors such as influent flow rate, effluent requirements, concentration of target compounds in the influent stream, temperature, and expected peak variations of any of these factors.

Each treatment zone may contain a fluidizable media to host microorganisms. Each treatment zone may be maintained at different conditions to enhance growth of different microorganisms. Without being bound by any particular theory, different microorganisms may promote different biological processes. For example, passing wastewater through denitrifying bacteria may increase the efficiency of a denitrifying process. Likewise, passing wastewater through nitrifying bacteria may increase the efficiency of a nitrifying process. The bioreactor may also comprise means for maintaining the fluidizable media within each treatment zone during operation. For example, a screen, perforated plate, baffle or fluid countercurrents may be used to maintain the fluidizable media within each treatment zone. The fluidizable media may, but need not be, similar in each treatment zone.

Prior to normal operation, the system may undergo a period of startup. Startup may involve biomass acclimation to establish a population of bacteria. Startup may run from several minutes to several weeks, for example, until a steady-state condition of biological activity has been achieved in one or more treatment unit operations.

As mentioned, the bioreactor may comprise multiple biological treatment zones. The bioreactor may comprise a first treatment zone. The first treatment zone may be an anaerobic treatment zone, maintained at anaerobic conditions to promote the growth and/or metabolic activity of anaerobic bacteria. The term "anaerobic conditions" is used herein to refer, in general, to an absence of oxygen. The first treatment zone may be maintained, for example, at less than 0.2 mg/L of dissolved oxygen (DO) content. The anaerobic bacteria may, for example, facilitate and/or enhance the efficiency of a phosphorous release bioprocess in which the bacteria may take up volatile fatty acids through a mechanism involving hydrolysis and release of phosphate.

The bioreactor may also comprise a second treatment zone. The second treatment zone may be an anoxic treatment zone, maintained at anoxic conditions to promote the growth and/or metabolic activity of anoxic bacteria. The term "anoxic conditions" is used herein to refer, in general, to a lack of oxygen. The second treatment zone may be maintained, for example, at less than 0.5 mg/L DO content. The anoxic bacteria may, for example, facilitate and/or enhance the efficiency of a denitrification process in which the bacteria may reduce nitrate to gaseous nitrogen while respiring organic matter.

The bioreactor may further comprise a third treatment zone. The third treatment zone may be an aerobic treatment zone, maintained at aerobic conditions to promote the growth and/or metabolic activity of aerobic bacteria. The term "aerobic conditions" is used herein to refer, in general, to the presence of oxygen. The aerobic bacteria may, for example, facilitate and/or enhance the efficiency of a nitrifying bioprocess in which ammonia is oxidized to form nitrite which is in turn converted to nitrate. The aerobic bacteria may also, for example, facilitate and/or enhance the efficiency of a phosphorous uptake bioprocess in which soluble phosphorous is restored to the bacteria.

The bioreactor may comprise additional treatment zones not herein mentioned. Indeed, a plurality of the above-mentioned biological treatment zones may be utilized in the treatment systems of the invention. One or more treatment zones may be run simultaneously. One or more treatment zones may be operated continuously or as a batch process.

The wastewater treatment system may also contain one or more separators. The separator may comprise one or more unit operations capable of separating a wastewater stream into one or more components. For example, the separator may filter and/or clarify a wastewater stream to produce a concentrated mixed liquor and a filtrate. The separator may be positioned downstream of one or more of the biological treatment zones to act upon a wastewater stream after it has undergone biological processes and/or while it is undergoing biological processes. For example, the separator may be positioned downstream of an aerobic treatment zone. The separator may be housed in the same vessel as one or more of the biological treatment zones. Alternatively, the separator may be housed in a separate vessel apart from the bioreactor.

According to one or more embodiments, the wastewater treatment system may be a membrane bioreactor system in which the separator may comprise a membrane operating system (MOS). The MOS may comprise one or more porous or semi-permeable membrane. The membrane may be positioned so as to be submerged during operation and may have any configuration suitable for a particular purpose, such as a sheet or hollow tube. The membrane may be formed of any material (natural or synthetic) suitable for a particular filtration process. In one embodiment, for example, the membrane is formed of polymeric hollow fibers, such as those made of polyvinylidene fluoride polymer.

One or more membranes may be positioned in one or more membrane modules within the MOS. The membrane modules may have any shape and cross-sectional area suitable for use in a desired application, for example, square, rectangular or cylindrical. For example, membrane modules may be used such as those described in U.S. Pat. No. 6,872,305, which is incorporated herein by reference in its entirety. Multiple membrane modules may be positioned adjacent to one another or at predetermined positions within the MOS. The membrane modules may be positioned at any angle, including vertical and horizontal, within the MOS. In one embodiment, a plurality of membrane modules may be mounted to a module support rack to facilitate membrane maintenance and/or replacement.

In accordance with one or more embodiments of the wastewater treatment system, an aerobic treatment zone may be fluidly connected downstream of an anoxic treatment zone. A separator may be fluidly connected downstream of the aerobic treatment zone. An anaerobic treatment zone may be fluidly connected upstream of the anoxic treatment zone. Thus, according to one or more embodiments, wastewater entering the wastewater treatment system may pass through an anaerobic treatment zone, an anoxic treatment zone, an aerobic treatment zone and a separator, in series. A recycle system may fluidly connect the separator, most typically a concentrated mixed liquor exiting the separator, to any of the anaerobic, anoxic and/or aerobic treatment zones and may also interconnect the treatment zones.

In accordance with one or more embodiments of the present invention, the wastewater treatment system may strategically manage the concentration of oxygen in streams within the system to facilitate pollutant removal. Oxygen may be present in various forms within the bioreactor. For example, streams within the system may contain dissolved oxygen and/or oxygenated species, such as, but not limited to, nitrates and nitrites, any of which may either originate in the wastewater or be produced by biological processes occurring within the bioreactor. Without being bound by any particular theory, the presence of oxygen may promote certain biological processes, such as aerobic biological processes, while inhibiting others such as anaerobic biological processes. More specifically, oxygen may interfere with portions of metabolic schemes involved in the biological removal of nitrogen. Oxygen may also interfere with release of phosphorous, which may in turn limit the uptake of phosphorous. Thus, delivering wastewater streams with a high concentration of oxygen to treatment zones where oxygen may promote biological activity, and reducing the concentration of oxygen in wastewater streams delivered to treatment zones where oxygen can interfere with biological processes, may be beneficial. Strategic management of the concentration of oxygen in streams within the wastewater treatment system may allow reduced equipment size, faster reaction rates and overall improved biological removal of pollutants.

Thus, in certain embodiments of the present invention, wastewater streams may be recycled within the system for additional treatment while strategically managing their oxygen concentration. For example, a wastewater stream exiting a separator may be recycled to an aerobic treatment zone for further processing and to benefit from its oxygen content because the presence of oxygen may be advantageous to biological processes occurring therein. Furthermore, a stream exiting an aerobic treatment zone, with a depleted oxygen concentration, may be recycled to anaerobic and/or anoxic treatment zones for further processing where oxygen may interfere with biological processes occurring therein. In this way, the concentration of oxygen in streams within the treatment system may be strategically managed to enhance removal of pollutants from the wastewater.

Liquid circuits may operate within some embodiments of the present invention. As used herein, the term liquid circuit is intended to define a particular connection and arrangement of valves and lines that allows a liquid stream to flow therein. A first liquid circuit may fluidly connect an outlet of the separator to an inlet of the aerobic treatment zone. The first liquid circuit may therefore deliver a stream rich in oxygen to a treatment zone where oxygen may be beneficial to biological processes occurring therein. A second liquid circuit may fluidly connect an outlet of the aerobic treatment zone to an inlet of the anaerobic and/or anoxic treatment zones. Thus, the second liquid circuit may deliver a wastewater stream with a depleted concentration of oxygen to treatment zones where oxygen may interfere with biological processes occurring therein.

Certain embodiments of the present invention may also comprise a source of biodegradable carbon to aid in controlling the concentration of oxygen within the wastewater treatment system. The biodegradable carbon may be any metabolizable carbon capable of participating in or facilitating biological activity of microorganisms. For example, the biodegradable carbon can serve as an electron donor in metabolic schemes that reduce the oxygen concentration of a liquor containing such microorganisms. The carbon source may be, for example, methanol, sugar, raw sewage, acetone or any commercially available material for this purpose, such as a MicroC™ methyl alcohol solution available from Environmental Operating Solutions, Inc., Falmouth, Mass. Without being bound by any particular theory, microorganisms in the wastewater treatment system may consume the biodegradable carbon while depleting the concentration of oxygen. Again, the oxygen may be found in various forms within wastewater streams of the system, for example, as dissolved oxygen or in oxygenated compounds not yet reduced by biological processes, such as nitrates. In some embodiments, the source of biodegradable carbon may be fluidly connected to one or more biological treatment zones to reduce the concentration of oxygen entering the treatment zone. For example, the source of biodegradable carbon may be fluidly connected to an anoxic treatment zone and/or an anaerobic treatment zone.

According to some embodiments of the present invention, a feed of biodegradable carbon may be introduced to a wastewater stream entering an anoxic treatment zone. There may be a retention period during which the wastewater stream remains in contact with the biodegradable carbon prior to blending with the wastewater in the remainder of the anoxic treatment zone in order to promote oxygen depletion. For example, a baffle or other means to increase residence time may be positioned within the anoxic treatment zone to provide this retention period. Further embodiments may involve one or more vessels that provide the desired period. Depletion of oxygen may allow the anoxic treatment zone to operate at a lower oxidation-reduction potential (ORP) condition, thus enabling the release of more soluble phosphorous for aerobic uptake. Depletion of oxygen may also increase the rate of reaction for denitrification of nitrate in the anoxic treatment zone to attain overall lower effluent concentrations of nitrate and total nitrogen.

The biodegradable carbon may be added in any manner. For example, the biodegradable carbon may be metered directly into a wastewater stream within the system. Alternatively, the biodegradable carbon may be added to the wastewater stream in a deoxygenation tank. The amount of biodegradable carbon fed to the wastewater treatment system may vary based on the wastewater treatment application. For example, the amount of biodegradable carbon added may be a quantity necessary to ensure the depletion to a desired quantity of oxygen present in a wastewater stream within the system, such as 2 ppm of carbon per 1 ppm of oxygen. Certain embodiments of the present invention may include a sensor, for example a DO galvanic probe, a DO optical probe, an ORP probe, or other sensor which measures process conditions, to aid in detecting the concentration of oxygen present at any point within the treatment system. The sensor may be positioned, for example, so as to determine the concentration of oxygen in a wastewater stream entering an anoxic treatment zone.

Figure 1:
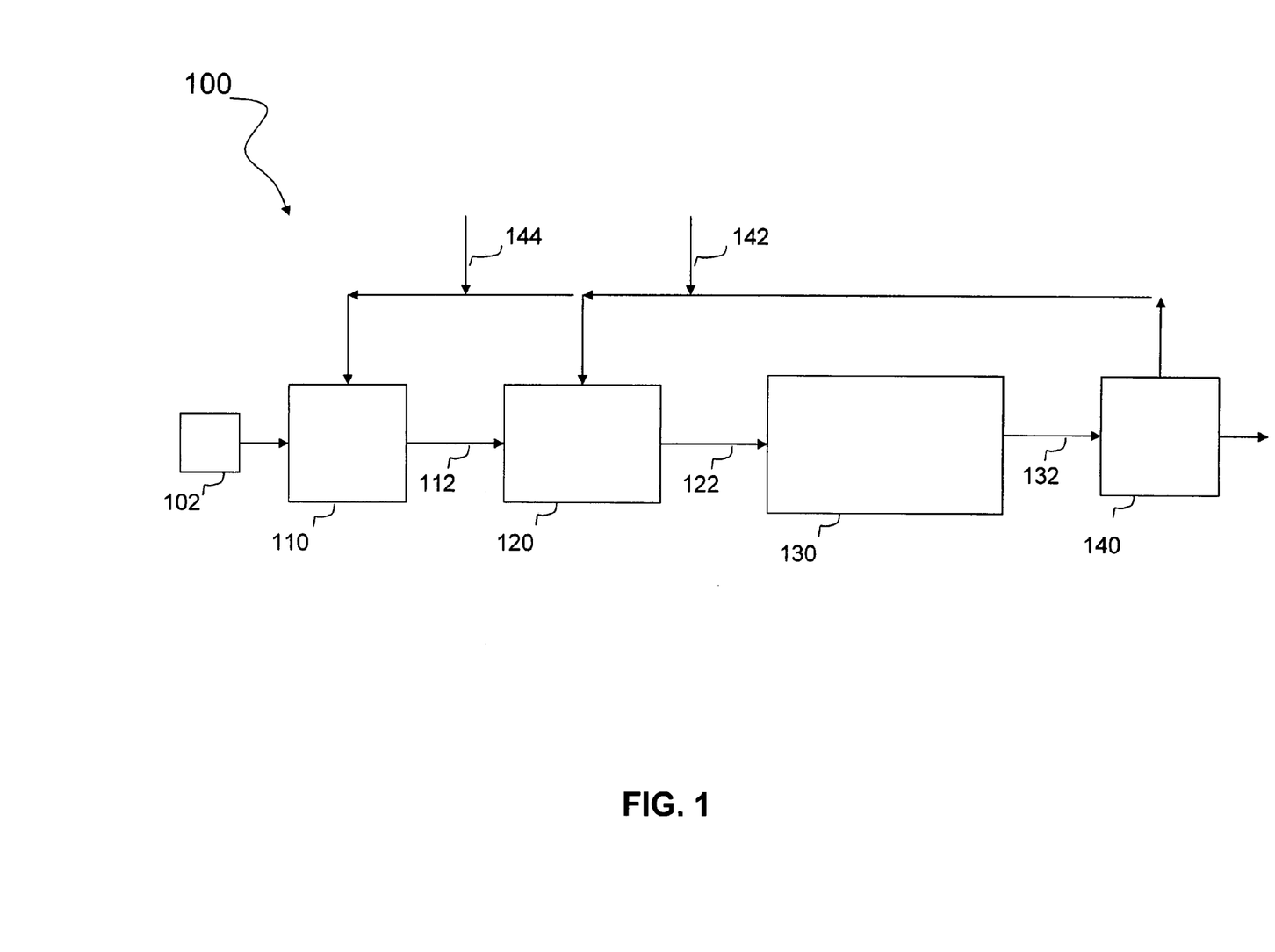
FIG. 1 is a block diagram in accordance with one or more embodiments of the invention.

Referring now to the drawings and, more particularly to FIG. 1 thereof, wastewater treatment system 100 is described which is constructed in accordance with one or more embodiments of the present invention. Components of wastewater treatment system 100 may be made of any material chemically and physically suitable for use in accordance with the conditions of the invention.

Wastewater may enter the wastewater treatment system 100 from a source 102 at any flow rate Q and system 100 may be sized to accommodate any flow rate Q. Without being limited, it is believed that the flow rate Q may be as high as 3 million gallons per day, and is more typically between about 0.1 and 1.5 million gallons per day. The wastewater may be introduced into a first treatment zone 110, which may be an anaerobic treatment zone, to form a first water product. At least a portion of the first water product may then be withdrawn from the first treatment zone 110 and introduced as stream 112 into a second treatment zone 120, which may be an anoxic treatment zone, to form a second water product. A flow rate of stream 112 may be any multiple of Q. For example, in one embodiment, the flow rate of stream 112 may be 3Q.

At least a portion of the second water product may then be withdrawn from the second treatment zone 120 and introduced as stream 122 into a third treatment zone 130, which may be an aerobic treatment zone, to form a third water product. A flow rate of stream 122 may be any multiple of Q. For example, in one embodiment, the flow rate of stream 122 may be 7Q. At least a portion of the third water product may then be withdrawn from the third treatment zone 130 and introduced as stream 132 into a separator 140. A flow rate of stream 132 may also be any multiple of Q. For example, in one embodiment, the flow rate of stream 132 may be 7Q. One or more unit operations in separator 140 may separate stream 142 into one or more components. For example, a filtrate and a concentrated mixed liquor may be produced by separator 140.

At least a portion of the concentrated mixed liquor exiting separator 140 may be recycled to the first and/or second treatment zones 110, 120 for additional treatment. The flow rate of the recycle stream may be any multiple of influent flow rate Q. The volume of concentrated mixed liquor that is recycled may, for example, be determined based on discharge requirements, influent flow rate, influent pollutant concentration and/or a condition in the first and third treatment zones 110, 130 and to some extent conditions in the second treatment zone 120. For example, in one embodiment, the concentrated mixed liquor from separator 140 may be recycled at a flow rate of 6Q. A source of biodegradable carbon, such as methanol, may be introduced to the stream of concentrated mixed liquor recycled from separator 140 to the first and/or second treatment zones 110, 120 at streams 142, 144. The carbon feed may aid in reducing the concentration of oxygen entering these treatment zones where oxygen may interfere with biological activity.

The flow rate of any stream entering or exiting any treatment zone may vary based on operating conditions within the system 100. For example, the flow rate of stream 112 may vary based on factors such as influent flow rate Q and the volume of any recycle stream. Likewise, the flow rates of streams 122 and 132 may also vary. In general, the system 100 may operate such that the total volume entering any one treatment zone is equal to the total volume exiting that treatment zone.

Figure 2:
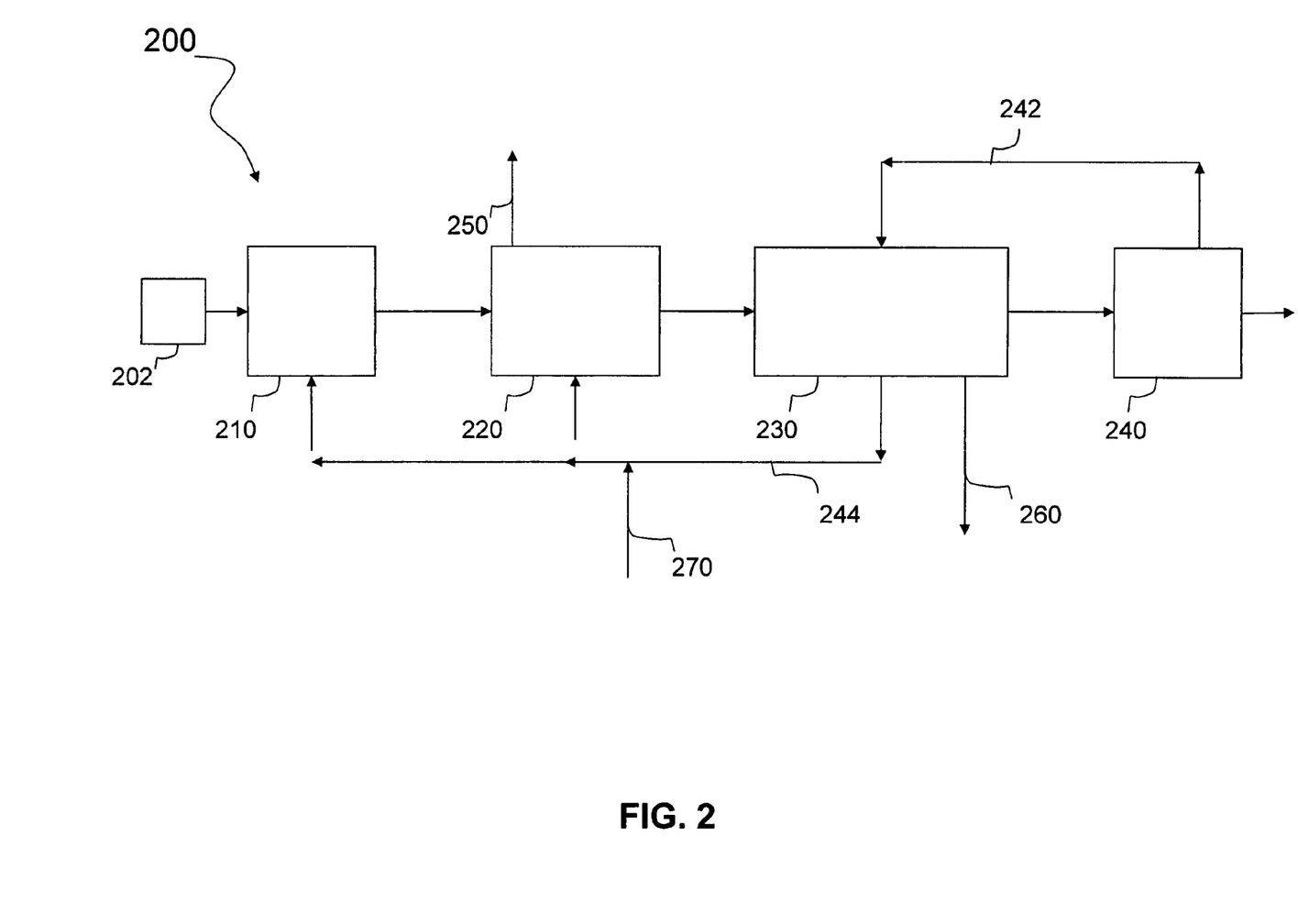
FIG. 2 is a block diagram in accordance with one or more embodiments of the invention illustrating a recycle regime for managing the concentration of oxygen in streams within the system.

FIG. 2 illustrates another embodiment of the present invention. Wastewater entering the wastewater treatment system 200 from source 202 may be introduced into a first treatment zone 210, which may be an anaerobic biological treatment zone. The wastewater may then be treated in a second treatment zone 220, which may be an anoxic biological treatment zone, and be further treated in a third treatment zone 230, which may be an aerobic biological treatment zone. The wastewater may then enter a separator 240 where it may undergo one or more unit operations to be separated into one or more components. For example, the separator may produce a filtrate and a concentrated mixed liquor. Nitrogen may be vented from the second treatment zone 220 at stream 250 and waste activated sludge may be purged from the third treatment zone 230 at stream 260.

Again, a portion of the concentrated mixed liquor exiting separator 240 may be recycled for additional treatment, such as to meet discharge requirements. Rather than delivering the concentrated mixed liquor directly back to the first and/or second treatment zones 210, 220 for further processing, the concentrated mixed liquor may be strategically recycled in a regime designed to enhance removal of pollutants from the wastewater through management of the oxygen concentration in streams within the system 200. A portion of the concentrated mixed liquor may be recycled as stream 242 to the third treatment zone 230 for additional treatment where its oxygen content may be beneficial to biological processes occurring therein. For an influent flow rate of Q, a flow rate of stream 242 may be any multiple of Q. The flow rate of stream 242 may, for example, be determined based on discharge requirements, influent flow rate, influent pollutant concentration, and/or conditions in any of the treatment zones. In one embodiment, for example, the flow rate of stream 242 may be 6Q.

A portion of the wastewater exiting the third treatment zone 230, with a depleted oxygen concentration, may be recycled as stream 244 to the first and/or second treatment zones 210, 220 for additional treatment where oxygen may interfere with biological processes occurring therein. Again, assuming an influent flow rate of Q, a flow rate of stream 244 may be any multiple of Q. The flow rate of stream 244 may also, for example, be determined based on discharge requirements, influent flow rate, influent pollutant concentration, and/or conditions in any treatment zone. In one embodiment, for example, the flow rate of stream 244 may be 4Q. Additionally, a source of biodegradable carbon, such as methanol, may be introduced to the stream of wastewater recycled from the third treatment zone 230 to the first and/or second treatment zones 210, 220 at 270 which may aid in further reducing the concentration of oxygen entering these treatment zones.

Thus, a first liquid circuit may be established from an outlet of the separator 240 to an inlet of the third treatment zone 230. A second liquid circuit may be established from an outlet of the third treatment zone 230 to an inlet of the first and/or second treatment zones 210, 220. A controller (not shown) may be configured to generate control signals to establish the first and/or second liquid circuits. For example, the controller may be configured to generate a first control signal that establishes the first liquid circuit from an outlet of separator 240 to an inlet of the third treatment zone 230, and further configured to generate a second control signal that establishes the second liquid circuit from an outlet of the third treatment zone 230 to an inlet of the first and/or second treatment zone 210, 220.

Again, the flow rate of any stream entering or exiting any treatment zone may vary based on operating conditions within the system 200. In general, the system 200 may operate such that the total volume entering any one treatment zone is equal to the total volume exiting that treatment zone.

Other embodiments of the present invention may include techniques that facilitate varying an effective treatment time under anoxic or aerobic treatment conditions within the system. As used herein, the term "effective treatment time" is used to describe a period of time during which the wastewater is exposed to particular conditions. Variations in effective treatment time under anoxic or aerobic treatment conditions may be desirable based upon variations in influent flow rate and/or the concentration or level of one ore more relevant target compounds. For example, when the flow rate of wastewater entering the wastewater treatment system decreases, nitrification may be less of a concern and so it may be desirable to focus on denitrification as facilitated by anoxic biological processes. This may enable the wastewater treatment system to eliminate peaks of nitrogen that may result during periods of higher flow rate. Conversely, when flow rate of wastewater increases, it may be more desirable to nitrify as facilitated by aerobic biological processes which may, in turn, feed denitrification biological processes. Thus, certain embodiments of the invention are directed to addressing seasonal and/or diurnal characteristics of the influent wastewater stream. Certain embodiments of the present invention may include a flowmeter to aid in monitoring influent flow rate.

It may also be desirable to vary an effective treatment time under anoxic or aerobic treatment conditions based on fluctuations in a concentration of a target constituent within the treatment system. For example, a high concentration of nitrate in the influent wastewater stream may make it desirable to increase anoxic treatment time so that the system may be primarily efficient in eliminating nitrogen via denitrification. Alternatively, if there is a high concentration of ammonia in the influent wastewater stream, it may be more desirable to increase aerobic treatment time so that the system may be primarily efficient in nitrifying the ammonia for further processing within the system. Certain embodiments of the present invention may include sensors to aid in monitoring the concentration of target constituents in the influent wastewater stream. For example, the wastewater treatment system may include a COD, TOC, BOD and/or ammonia sensor.

The treatment system may extend and/or shorten the effective treatment time under anoxic or aerobic conditions from a design condition. As used herein, the term "design condition" is used to refer to normal operating conditions. Varying the effective treatment time under anoxic or aerobic conditions may be achieved using any technique capable of altering the duration of time during which the wastewater is exposed to anoxic or aerobic conditions. For example, varying the effective treatment time may be facilitated by varying an effective residence time of a wastewater stream under anoxic or aerobic conditions. This may be achieved, for example, by regulating the flow rate of one or more wastewater streams through one or more anoxic or aeration treatment zones.

Alternatively, the system of the present invention may comprise an aeration system, in fluid communication with a biological treatment zone, whereby a flow of air, or other oxygen-supplying stream, may be switched on or off in at least a portion of the biological treatment zone. The system may further prevent introduction of air, for example from another biological treatment zone or source, after the flow of air has been switched off. For example, one or more screens, perforated plates, baffles and/or fluid countercurrents may be used within the biological treatment zone to prevent the introduction of air.

The system may facilitate varying an effective treatment time under anoxic conditions by varying an effective volume of an anoxic treatment zone. As used herein, the term "effective volume" is used to refer to the volume of treatment zone maintained at anoxic or aerobic conditions into which the wastewater may be introduced. For example, the system may comprise a controller in communication with an aeration system and configured to generate a first control signal to allow increase of an effective volume of an anoxic treatment zone during a first biological treatment mode of operation, and further configured to generate a second aeration control signal to allow reduction of the effective volume of the anoxic treatment zone to, for example, a design condition during a second biological treatment mode of operation.

Figure 3:
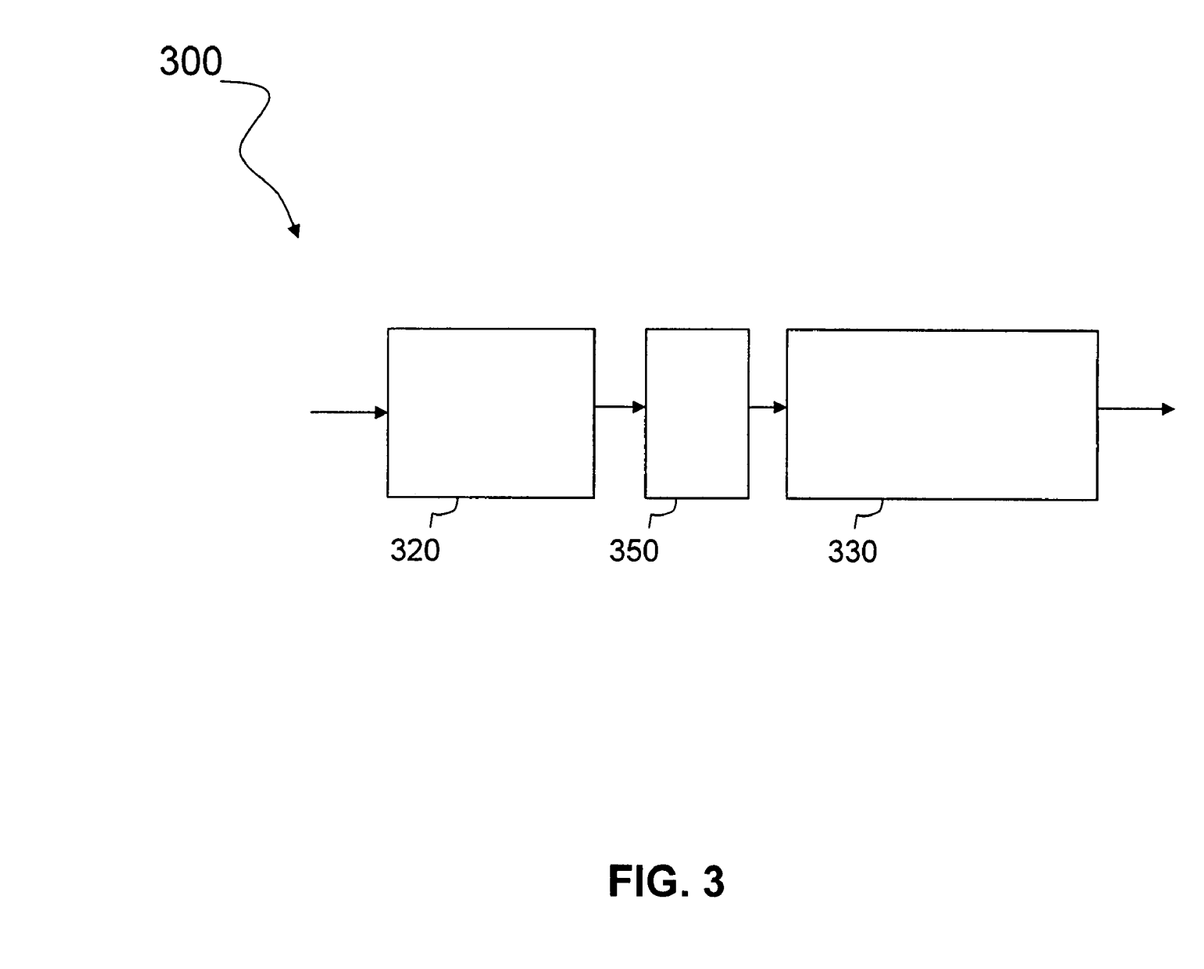
FIG. 3 schematically illustrates a swing zone in accordance with one or more embodiments of the invention.

FIG. 3 illustrates another embodiment of the present invention wherein treatment system 300 may comprise one or more swing zones 350 to facilitate varying an effective treatment time, or volume, under anoxic or aerobic conditions. Swing zone 350 may be a biological treatment zone wherein a source of air (not shown) may be regulated. Without being bound by any particular theory, introducing air within swing zone 350 may result in aerobic treatment conditions within swing zone 350 while reducing air may result in anoxic treatment conditions within swing zone 350. Swing zone 350 may be positioned anywhere within treatment system 300. For example, swing zone 350 may be positioned between an anoxic treatment zone 320 and an aerobic treatment zone 330 as illustrated.

The effective treatment time under anoxic or aerobic conditions may be varied simultaneously with operation of the recycle regime and/or the introduction of biodegradable carbon both discussed above.

It should be appreciated that numerous alterations, modifications and improvements may be made to the illustrated systems and methods.

In all modes of operation, any compound may be added to the treatment zones to promote and enhance the growth of bacteria capable of targeting pollutants in the wastewater stream to be treated.

The wastewater treatment system of the various embodiments of the present invention may also comprise anything capable of providing a volume to induce oxygen depletion within recycled wastewater streams prior to re-introduction to the biological process, such as a vessel or pipe. For example, an oxygen depletion unit may be sized to accept a portion of the concentrated mixed liquor exiting the separator and/or a portion of a wastewater stream exiting the aerobic treatment zone. The oxygen depletion unit may aid in controlling the oxygen content in wastewater streams delivered to treatment zones within the wastewater treatment system where the presence of oxygen may interfere with biological processes therein.

According to another embodiment, the wastewater treatment system may comprise one or more pretreatment units. The one or more pretreatment units may be positioned typically upstream of the first treatment zone. The system may, for example, include one or more pretreatment units serving to screen an influent stream to collect solids or other undesirable constituents, such as fats, oil and grease. In some embodiments, for example, the one or more pretreatment units may include a perforated plate continuous screen having 2 mm openings. Other pretreatment units may involve chemical treatment systems which, for example, precipitate, convert, or adjust a condition of an influent stream.

Some embodiments of the present invention may include one or more treatment systems positioned upstream of the separator to facilitate filtration and/or clarification. Other embodiments of the present invention may include one or more treatment systems positioned downstream of the separator to further treat effluent before it is released from the system, such as a chemical treatment system. One or more screening units may be used to prevent solids or other undesirable constituents from entering the chemical treatment system.

According to another embodiment, the wastewater treatment system may comprise a reserve storage tank fluidly connected to the bioreactor to normalize flow into the bioreactor. The reserve storage tank may be sized to accommodate fluctuations in wastewater generation.

Although various embodiments exemplarily shown have been described as using sensors, it should be appreciated that the invention is not so limited. For example, rather than requiring any electronic or electromechanical sensors, the measurement of various levels could alternatively be based upon the senses of an operator.

In some embodiments, the wastewater treatment system can include sensors for measuring at least one property or operating condition of the system, such as sensors for measuring pH, temperature, salinity, turbidity, and pressure drop, for example, at different points in the system thus enabling further monitoring for system optimization.

In accordance with other embodiments of the present invention, the wastewater treatment system can also include one ore more controllers for adjusting or regulating at least one operating parameter of the system or a component of the system, such as, but not limited to, actuating valves and pumps. The controller may be capable of monitoring and regulating the operating conditions of the wastewater treatment system including its components. The controller may be in communication with one or more sensors. The controller is typically a microprocessor-based device, such as a programmable logic controller (PLC) or a distributed control system, that receives and/or sends input and output signals to and from components of the wastewater treatment system. For example, the controller may control the introduction of biodegradable carbon. The controller may regulate the flow rate of streams within the wastewater treatment system. The controller may control the amount of wastewater recycled throughout the wastewater treatment system. The controller may also vary an effective volume of an anoxic or aerobic treatment zone within the wastewater treatment system. The controller may likewise vary an effective treatment time under anoxic or aerobic conditions within the wastewater treatment system.

The invention contemplates the modification of existing facilities to retrofit one or more systems, or components in order to implement the techniques of the invention. Thus, for example, an existing facility can be modified to include a controller executing instructions in accordance with one or more embodiments exemplarily discussed herein. Alternatively, existing control systems can be reprogrammed or otherwise modified to perform any one or more acts of the invention. Existing wastewater treatment systems can be converted to wastewater treatment systems in accordance with systems and techniques described herein utilizing at least some preexisting equipment such as the shell and wetted parts. It is envisioned that the biodegradable carbon feed approach could be retrofitted to existing facilities that were designed without any such provision without requiring significant construction efforts. Likewise, a recycle system in accordance with embodiments of the present invention may be adapted to existing biological treatment zones. A swing zone in accordance with one or more embodiments of the present invention could also be implemented in existing biological treatment systems.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. For example, wastewater treatment systems of the invention may further involve a combination of separation operations such as settlers and, in some cases, hydrocyclones. Those skilled in the art should also recognize, or be able to ascertain, using no more than routine experimentation, equivalents to the specific embodiments of the invention. It is therefore to be understood that the embodiments described herein are presented by way of example only and that, within the scope of the appended claims and equivalents thereto, the invention may be practiced otherwise than as specifically described.

The invention claimed is:

1. A wastewater treatment system, comprising:
   a first biological treatment zone;
   a second biological treatment zone fluidly connected to the first biological treatment zone;
   a membrane module comprising a filter membrane fluidly connected to the second biological treatment zone;
   a recycle system fluidly connecting the membrane module to the first biological treatment zone;
   a source of biodegradable carbon fluidly connected to the recycle system;
   a sensor disposed to monitor a characteristic of a liquid exiting the second biological treatment zone; and
   a controller configured to allow introduction of the biodegradable carbon based on a signal from the sensor;
   wherein the controller is further configured to generate a first control signal that establishes a first liquid circuit from an outlet of the membrane module to an inlet of the second biological treatment zone, and further configured to generate a second control signal that establishes a second liquid circuit from an outlet of the second biological treatment zone to an inlet of the first biological treatment zone.

2. The system of claim 1, wherein the first biological treatment zone is an anoxic zone.

3. The system of claim 2, wherein the second biological treatment zone is an aerobic zone.

4. The system of claim 3, further comprising a third biological treatment zone fluidly connected to a source of the wastewater and to the first biological treatment zone.

5. The system of claim 4, wherein the third biological treatment zone is an anaerobic zone.

6. The system of claim 4, wherein an outlet of the second biological treatment zone is fluidly connected to an inlet of the third biological treatment zone.

7. The system of claim 1, wherein an outlet of the membrane module is fluidly connected to an inlet of the second biological treatment zone.

8. The system of claim 7, wherein an outlet of the second biological treatment zone is fluidly connected to an inlet of the first biological treatment zone.

9. The system of claim 1, wherein the sensor comprises an ORP sensor.

* * * * *